C. L. CADLE.
ELECTRODE FOR WELDING, BRAZING, SOLDERING, OR THE LIKE.
APPLICATION FILED FEB. 25, 1915.

1,193,989.

Patented Aug. 8, 1916.

WITNESSES:
Walter B. Payne
Mildred E. Patrick

INVENTOR
Charles L. Cadle
BY
his ATTORNEYS

UNITED STATES PATENT OFFICE.

CHARLES L. CADLE, OF ROCHESTER, NEW YORK.

ELECTRODE FOR WELDING, BRAZING, SOLDERING, OR THE LIKE.

1,193,989. Specification of Letters Patent. Patented Aug. 8, 1916.

Application filed February 25, 1915. Serial No. 10,587.

*To all whom it may concern:*

Be it known that I, CHARLES L. CADLE, of Rochester, in the county of Monroe and State of New York, have invented certain new and useful Improvements in Electrodes for Welding, Brazing, Soldering, or the like; and I do hereby declare the following to be a full, clear, and exact description of the same, reference being had to the accompanying drawings, forming a part of this specification, and to the reference-numerals marked thereon.

My invention has for its object to provide an improved form of electrode for electric welding, brazing or soldering and has reference more particularly to the class of apparatus employed for welding bonds to rails in electric railway work.

The invention has for a further object to afford a welding, brazing or soldering electrode that is especially adapted for work with high voltage currents, making it possible to employ the main current of an electric railway system without interposing any current increasing means.

In a more specific aspect, the invention consists in the construction of an electrode possessing a high degree of resistance at the point of weld, or adjacent to the body to be welded, and composed of such materials that it is capable of receiving a high voltage current and of reaching a state of incandescence sufficient for welding, brazing or soldering without a breaking down of the adjacent particles of the electrode mass, or melting or volatilization of the molecules within the electrode due to the arcing effect.

To these and other ends the invention consists of certain improvements and combinations of parts all as will be hereinafter more fully described, the novel features being pointed out in the claims at the end of the specification.

Figure 1:
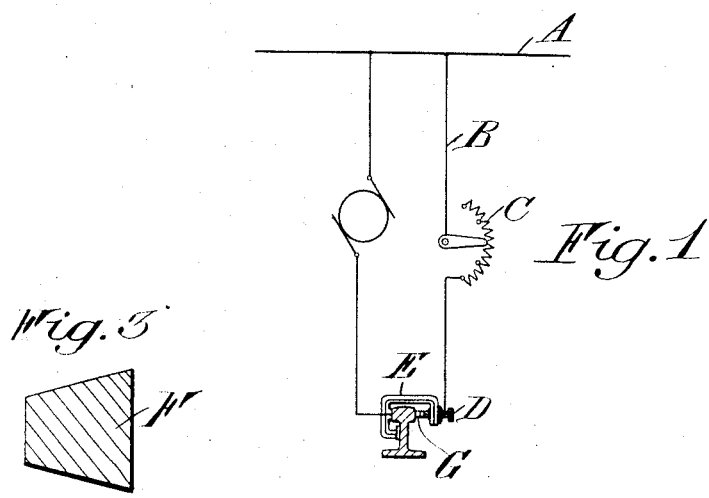
Figure 3:
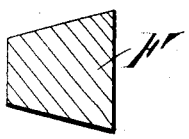
Figure 2:
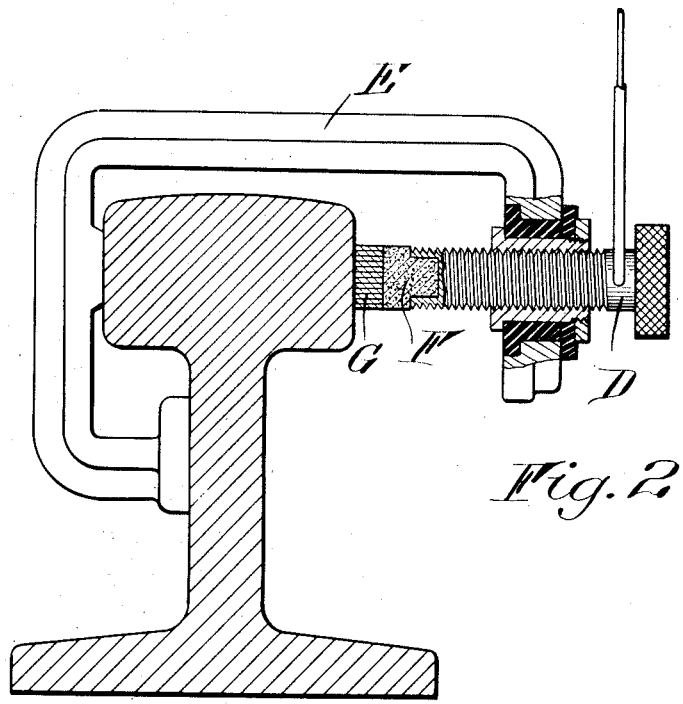

In the drawings: Figure 1 is a diagrammatic view illustrating a method of using an electrode constructed in accordance with the invention; Fig. 2 is an enlarged view partially in section of the electrode and support, and Fig. 3 is a detail view of a modified form of electrode.

Similar reference characters throughout the several figures indicate the same parts.

My invention is in the nature of an improvement in the class of apparatus disclosed in the patent of Herrick, August 4, 1914, No. 1,106,347, and while the application which is described herein refers to the welding of rail bonds, by current taken direct from the trolley wire of an electric railway system, the invention is susceptible to various other uses, and may be employed with particular advantage in any relation where a high tension current is utilized and it is undesirable to use a current increasing apparatus.

My invention is particularly adapted to the present practice of electric railways and other industries utilizing electrical voltage for hauling, where a high tension conductor is used, that is to say, where a voltage of from 150 to 1500 or more is carried between conductors, and the present improvement makes it possible to eliminate the use of current increasing apparatus which has heretofore been required for obtaining sufficient current from a high voltage system to produce the required heat in an electrode, owing to the relatively low resistance of the electrodes employed. The invention may be adopted successfully with any current having a voltage not less than that required across the electrode at the point of weld where it abuts or contacts with the work to be welded, brazed or soldered.

The purpose of the invention may be accomplished in various ways and I have found by actual experiment that I am able to obtain successful results by utilizing as the electrode element a solid body possessing a high degree of resistance at the welding point, or adjacent to the body to be welded. The electrode is constituted by a single unit mass of material which is preferably solid, the resistance being lower at the point where the current enters, and comparatively high at the point of weld. According to my invention, I construct an electrode from a combination of ingredients which include as two constituents, carbon and carborundum, the carborundum forming a large proportion of the mixture which may be varied according to the particular circumstances. The electrode may be formed according to the usual known process of making a carbon block, carborundum being added to the mixture. The whole mass, which also contains glucose, or some other suitable binder, is heated, while subjected to pressure in a hydraulic press or otherwise.

The resistance of the electrode may vary at different points, being lower where the conductor is connected and highest where it contacts with the body to be welded, and this variation in resistance may be accomplished in different ways. One method consists in varying the proportions of the mixture, a greater amount of carborundum being incorporated in the block at the welding point and a lesser amount being embodied at the portion of the block where connection with the conductor is made. Another method of accomplishing this consists in forming the electrode of such a shape as to provide a greater mass at one part than at another. For instance, it may be tapered, the narrow end of the tapered block constituting the welding portion by reason of its higher resistance than the larger end, to which the conductor is connected.

In the present embodiment, A designates the usual trolley wire and B is a lead extending therefrom and containing a variable artificial resistance C. It will be understood that the lead B and the other part of the apparatus to be referred to may be arranged as a portable outfit for railway work and can be detachably connected to the trolley wire. The lead B connects with a conductor or post D, adjustably mounted in a bracket or support E and connecting with the electrode F.

G designates the bond to be welded, which the electrode engages.

The electrode F may be mounted on the conductor D in any desirable manner, the specific form of construction of this feature constituting no essential part of the invention, and I have shown the conductor D recessed at its end and engaging a coöperating projection on the electrode. By adjusting the conductor D within the bracket E, any degree of pressure may be exerted on the electrode engaging the bond.

Any other structure for mounting the electrode may be utilized, and the invention is not limited in this respect, it being intended to cover by this application any analogous or equivalent structures coming within the spirit of the invention and the terms of the appended claims.

I claim as my invention:

1. The combination with a high tension conductor, of an electrode for welding, brazing or soldering adapted to receive a high voltage current directly from the conductor and comprising a solid body composed in part of carborundum.

2. The combination with a high tension conductor, of an electrode for welding, brazing or soldering adapted to receive a current of high voltage directly from said conductor and comprising a solid body composed of a large proportion of carborundum combined with carbon and a binding medium.

3. The combination with a high tension conductor, of an electrode for welding, brazing or soldering adapted to receive a current of high voltage directly from the conductor and comprising a solid body characterized by a high resistance at the welding point.

4. An electrode for welding, brazing or soldering by contact with the work composed of a relatively high resistance material of such character that it can be heated to an incandescent state when connected directly to a conductor of relatively high voltage current without interposing a current increasing element.

CHARLES L. CADLE.

Witnesses:
  D. P. FALCONER,
  JULIA E. SPERRY.